2,938,020
Patented May 24, 1960

2,938,020
PROCESS FOR POLYMERIZATION OF OLEFINS

Albert S. Matlack, Wilmington, Del., assignor to Hercules Powder Company, Wilmington, Del., a corporation of Delaware No Drawing. Filed May 27, 1957, Ser. No. 661,573

19 Claims. (Cl. 260—94.9)

This invention relates to the polymerization of olefins under relatively mild conditions of pressure and temperature and, more particularly, to an entirely new type of catalyst system for the polymerization of olefins under such conditions.

K. Ziegler has described the polymerization of ethylene with organometallic compounds of the metals of Group III–A of the Periodic Table, i.e., organometallic compounds of aluminum, gallium and indium to produce polymers varying in molecular weight from dimers up to the wax range polymers. He has also described the preparation of high molecular weight crystalline polymers by contacting ethylene with a mixture of one of these organometallic compounds of aluminum, gallium or indium, etc., with a compound of a metal of Group IV–B, V–B, VI–B or VIII of the Periodic Table.

It has now been discovered that an entirely different type of catalyst may be used to polymerize ethylene and other ethylenically unsaturated hydrocarbons under relatively mild conditions of temperature and pressure. In accordance with this invention, ethylene or other ethylenically unsaturated hydrocarbons may be polymerized by contacting the olefin with one of the metals of Groups IV–B, V–B, VI–B or VII–B including thorium and uranium in combination with a haloalkane, the metal being in a finely divided state and having a freshly exposed surface in contact with the ethylene and haloalkane. Just what takes place between the metal and the haloalkane that produces a catalyst for the polymerization is not known. The fact remains that metals that do not catalyze the polymerization of ethylene, e.g., titanium, chromium, manganese, etc., are activated by the addition of a small amount of a haloalkane and the combination is an active catalyst for the polymerization of ethylene and other ethylenically unsaturated hydrocarbons.

Any 1-olefin such as ethylene, propylene, butene-1, pentene-1, hexene-1, octene-1, styrene, butadiene, isoprene, etc., or mixtures thereof may be polymerized in accordance with this invention.

Any of the transition metals of Groups IV, V, VI and VII are active catalysts for the polymerization of ethylene and other 1-olefins when combined with a haloalkane. Particularly effective metals of the sub-Groups IV–B, V–B, VI–B and VII–B are titanium, zirconium, hafnium, thorium, vanadium, niobium, tantalum, chromium and manganese. As already mentioned, the metal is most effective when used in a finely divided state with an active surface. Such finely divided metals may be obtained by ball milling in an inert atmosphere, atomizing the molten metal into an inert atmosphere, etc. In general, the finely divided metal will have an average particle size varying from about 1 micron or less to about 100 microns and preferably from about 1 micron to about 20 microns. Obviously, many means may be devised whereby the olefin may be contacted with the finely divided metal having an active surface. A particularly effective method of carrying out the process in accordance with this invention is to ball mill the metal in the presence of the haloalkane and olefin, either with or without an inert liquid diluent. By so doing, a fresh surface of the metal catalyst is continually contacted with the haloalkane and with the olefin being polymerized. A polymerization so started may be transferred to another vessel provided with adequate agitation such as with a high shear agitator. When operating in a ball mill, the metal may be in any desired shape, as for example, strip, foil, flake, etc., which will, of course, be reduced to the desired size during the ball milling operation, but for maximum efficiency it is preferably used in the form of finely divided powder or flake. Another method of operating the process is to atomize the metal into an inert gas and after cooling to about 200° C. or less add the mixture to the olefin stream or mixture of olefin and diluent. The process of this invention may be operated either on a batchwise scale or as a continuous operation.

Any haloalkane may be used in combination with the Group IV, V, VI or VII transition metal to catalyze the polymerization. Particularly effective are those haloalkanes wherein only one halogen is attached to a carbon atom, i.e., those having the general formula

where X is halogen, i.e., fluorine, chlorine, bromine or iodine, and the R's are hydrogen, alkyl or haloalkyl and may be alike or different. Exemplary of such haloalkanes are methyl chloride, methyl bromide, ethyl chloride, ethyl bromide, ethyl iodide, ethylene chloride, ethylene bromide, propyl bromide, n-butyl bromide etc. In some cases it may be desirable, athough not essential, to add a trace of iodine. Any amount of the haloalkane may be used in combination with the transition metal from a minor catalytic amount up to use as the total diluent, but in general will be an amount of from about 0.05% to about 100% based on the olefin. The above preferred class of haloalkanes having only one halogen attached to a carbon may be used along with less active haloalkanes such as chloroform, carbon tetrachloride, etc., that may be used as diluents for the polymerization process.

The polymerization process may be carried out in a wide variety of ways. It may be carried out in the presence or absence of an inert organic diluent as reaction medium. Generally, a diluent is used because it simplifies the isolation of the polymer at the end of the polymerization reaction. Any inert liquid organic diluent may be used, as for example, aliphatic hydrocarbons such as hexane, heptane, etc., cycloaliphatic hydrocarbons such as cyclohexane or aromatic hydrocarbons such as benzene, toluene, xylene, etc., or any mixture of such hydrocarbons, halogenated hydrocarbons such as chloroform, carbon tetrachloride, chlorobenzene, etc., or as mentioned above, the haloalkane cocatalyst or a mixture of such with any other halogenated hydrocarbon diluent.

The temperature and pressure used for the polymerization process may be varied over a wide range and will largely depend upon the method by which the olefin is contacted with the metal and haloalkane. In general, the polymerization will be carried out at room temperature or slightly above, but any temperature within the range of from about —80° C. to about 200° C. may be used, preferably from about 0° C. to about 100° C., and more preferably from about 20° C. to about 60° C. In the same way, while atmospheric pressure or a pressure of only a few pounds may be used, the polymerization may be carried out over a wide range of pressures, but higher pressures do not appreciably alter the course of polymerization and, hence, are not required. In general, it is desirable to operate under anhydrous and anaerobic conditions.

The following examples will demonstrate the process of polymerizing 1-olefins in accordance with this invention. The molecular weight of the polymers produced in these examples is indicated by the Reduced Specific Viscosity (RSV) given for each. By the term "Reduced Specific Viscosity" is meant the $\eta_{sp}/c$ determined on an 0.1% solution of the polymer in decalin, containing 0.1 g. of the polymer per 100 ml. of solution (unless otherwise indicated), at 135° C. Where the melting point of the polymer is given, it is the temperature at which the birefringence due to crystallinity disappears. All parts and percentages are by weight unless otherwise indicated.

EXAMPLES 1–5

In these examples the polymerization was carried out in cylindrical vibratory ball mills which were constructed of stainless steel (analysis: carbon—0.008% max.; Cr — 18.00–20.00%; Ni — 8.00–10.00%; Mn — 2.00% max.) and outfitted with a gas inlet tube and a main opening. The mills were 80% full of 0.5 inch stainless steel balls.

In each case the mill, previously dried for 4 hours at 120° C., was charged with 70 parts of n-heptane, which had been dried over phosphorus pentoxide, 2.0 parts of the metal in the form of powder, except in Example 3 where 3.0 parts of vanadium granules was used, and 4.3 parts of ethyl bromide containing a trace of iodine except in the case of Example 2 where 1.3 parts of ethylene chloride was used. The mill in each case was then capped, twice filled with dry nitrogen and evacuated and then ethylene was injected to a pressure of 50 p.s.i.g. After 16 hours of milling at room temperature, the polymer slurry was removed from the mill and the polyethylene was isolated by filtration. The polymer so obtained was purified by leaching with a 50:50 mixture of n-butanol and 48% hydrofluoric acid for 16 hours at room temperature, again separating the polymer by filtration and washing it free of acid with water and ethanol and then drying for 16 hours at 80° C. in vacuo. The catalyst metal and alkyl halide cocatalyst and the amount of each used, the final pressure, percent conversion of ethylene to polymer and the physical properties of the polymer obtained in each case are tabulated in Table I below along with control runs wherein in one case the alkyl halide was omitted, and in the other, the metal was omitted.

EXAMPLE 6

Example 1 was repeated except that 70 parts of n-heptane used as the diluent in that example was replaced with 160 parts of carbon tetrachloride. The polyethylene so obtained had an RSV of 2.3 and a melting point of 132° C.

EXAMPLES 7–9

The procedure described in Examples 1–5 was followed in these examples except that propylene was used in place of the ethylene charged in those examples. At the end of 16 hours the polymer slurry was removed from the mill. The heptane-insoluble polymer was isolated by centrifugation and purified by the same method as described in the foregoing examples for polyethylene. The heptane-soluble polymer was isolated from the reaction mixture filtrate by distilling off the diluent. The catalyst metal, alkyl halide cocatalyst and the amount of each used, the percent of heptane-soluble and heptane-insoluble polymer obtained in each case and the physical properties of the polymers are tabulated below along with control runs wherein metal catalyst but no alkyl halide was added.

*Table II*

| Example Number | Metal | Parts | Alkyl Halide | Parts | Heptane-Soluble Polymer | | Heptane-Insoluble Polymer | | |
|---|---|---|---|---|---|---|---|---|---|
| | | | | | Percent Total | RSV | Percent Total | RSV | Melting Point ° C. |
| Control | Ti | 2.0 | | | (1) | (1) | (1) | (1) | (1) |
| 7 | Ti | 2.0 | C₂H₅Br | 4.3 | 78 | 0.7 | 22 | 4.2 | 162 |
| Control | V | 2.0 | | | (1) | (1) | (1) | (1) | (1) |
| 8 | V | 2.0 | C₂H₅Br | 4.3 | 77 | 2.2 | 23 | | |
| Control | Th | 2.0 | | | (1) | (1) | (1) | (1) | (1) |
| 9 | Th | 2.0 | C₂H₅Br | 4.3 | 100 | 0.03 | 0 | | |

¹ No polymer formed.

EXAMPLE 10

The procedure of Example 8 was repeated except that 18 parts of styrene was polymerized instead of the propylene used in that example and 86 parts of toluene was used as the diluent. At the end of 16 hours the toluene-soluble and toluene-insoluble polymer fractions were separated as described above. The toluene-insoluble polymer had an RSV of 0.08 as measured on a 0.1% solution in α-chloronaphthalene at 135° C.

EXAMPLE 11

The procedure of Example 7 was repeated except that 16.3 parts of butadiene was substituted for the propylene. The polymer fractions were separated as before. The heptane-soluble fraction amounted to 14% and the heptane-insoluble fraction to 86% of the total polybutadiene.

The Periodic Chart used in this specification and appended claims for designating the groups and subgroups of the Periodic Table is that given in the "Handbook of Chemistry and Physics" published by Chemical Rubber Publishing Company, Cleveland, Ohio, on pages 392–3 of the 36th edition. Thus, the metals designated as Groups IV–B, V–B, VI–B and VII–B are those that occur in the left-hand side of Groups IV, V, VI and VII in the

*Table I*

| Example Number | Metal | Parts | Alkyl Halide | Parts | Final Pressure, p.s.i.g. | Percent Conversion | RSV | Melting Point, ° C. |
|---|---|---|---|---|---|---|---|---|
| Control | Ti | 2.0 | | | 50 | 0 | | |
| Do | | | C₂H₅Br | 4.3 | 50 | 0 | | |
| 1 | Ti | 2.0 | C₂H₅Br | 4.3 | −9 | 94 | 5.2 | 130 |
| 2 | Ti | 2.0 | C₂H₄Cl₂ | 1.3 | −12 | 49 | 3.4 | 131 |
| 3 | V | 3.0 | C₂H₅Br | 4.3 | −5 | 80 | 1.0 | 117 |
| 4 | Cr | 2.0 | C₂H₅Br | 4.3 | −5 | 78 | 3.1 | 132 |
| 5 | Mn | 2.0 | C₂H₅Br | 4.3 | 7 | 45 | 2.3 | 134 |

Mendeleev form of the Periodic Table (see Deming, "General Chemistry," sixth edition, 1952, John Wiley & Sons, Inc., New York).

What I claim and desire to protect by Letters Patent is:

1. The process of polymerizing a 1-olefin which comprises contacting said olefin with a mixture of from about 0.05% to about 100%, based on the weight of olefin, of a haloalkane and a finely divided metal having a freshly exposed surface and a particle size of from about 1 micron to about 100 microns, said metal being selected from the group consisting of the metals of Groups IV–B, V–B, VI–B and VII–B of the Mendeleev Periodic Table, and said haloalkane having the formula $R_1R_2R_3CX$ where X is halogen and $R_1$, $R_2$ and $R_3$ are selected from the group consisting of hydrogen, alkyl, and haloalkyl.

2. The process of claim 1 wherein the metal is a Group IV–B metal.

3. The process of claim 1 wherein the metal is a Group V–B metal.

4. The process of claim 1 wherein the metal is a Group VI–B metal.

5. The process of claim 1 wherein the metal is a Group VII–B metal.

6. The process of claim 2 wherein the haloalkane is an alkyl halide.

7. The process of claim 2 wherein the haloalkane is an alkylene halide having at least two carbon atoms.

8. The process of claim 3 wherein the haloalkane is an alkyl halide.

9. The process of claim 4 wherein the haloalkane is an alkyl halide.

10. The process of claim 5 wherein the haloalkane is an alkyl halide.

11. The process of claim 6 wherein the olefin is ethylene.

12. The process of claim 8 wherein the olefin is ethylene.

13. The process of claim 9 wherein the olefin is ethylene.

14. The process of polymerizing ethylene which comprises contacting ethylene with a mixture of from about 0.05% to about 100%, based on the weight of olefin, of an alkyl halide and finely divided titanium having a freshly exposed surface and a particle size of from about 1 micron to about 100 microns.

15. The process of polymerizing ethylene which comprises contacting ethylene with a mixture of from about 0.05% to about 100%, based on the weight of olefin, of an alkyl halide and finely divided vanadium having a freshly exposed surface and a particle size of from about 1 micron to about 100 microns.

16. The process of polymerizing ethylene which comprises contacting ethylene with a mixture of from about 0.05% to about 100%, based on the weight of olefin, of an alkyl halide and finely divided chromium having a freshly exposed surface and a particle size of from about 1 micron to about 100 microns.

17. The process of polymerizing ethylene which comprises ball milling a mixture of ethylene, ethyl bromide and finely divided titanium having a particle size of from about 1 micron to about 100 microns, said ethyl bromide being present in an amount of from about 0.05% to about 100% based on the weight of ethylene.

18. The process of polymerizing ethylene which comprises ball milling a mixture of ethylene, ethyl bromide and finely divided vanadium having a particle size of from about 1 micron to about 100 microns, said ethyl bromide being present in an amount of from about 0.05% to about 100% based on the weight of ethylene.

19. The process of polymerizing ethylene which comprises ball milling a mixture of ethylene, ethyl bromide and finely divided chromium having a particle size of from about 1 micron to about 100 microns, said ethyl bromide being present in an amount of from about 0.05% to about 100% based on the weight of ethylene.

References Cited in the file of this patent

UNITED STATES PATENTS

| | | |
|---|---|---|
| 2,721,189 | Anderson et al. | Oct. 18, 1955 |
| 2,727,023 | Evering | Dec. 13, 1955 |

FOREIGN PATENTS

| | | |
|---|---|---|
| 533,362 | Belgium | May 16, 1955 |
| 534,792 | Belgium | Jan. 31, 1955 |

OTHER REFERENCES

Gilman et al: Journal of Organic Chemistry, vol. 10, pages 505–515 (pages 512–515 relied on), 1949.

U.S. Industrial Chemicals Co., High Surface Sodium on Inert Solids, 19 pages, copyright 1953; address is 120 Broadway, New York 5, N.Y.